(12) United States Patent
Loch et al.

(10) Patent No.: US 12,304,415 B2
(45) Date of Patent: May 20, 2025

(54) COVER FOR AN AIRBAG DEVICE, INTERIOR TRIM PART AND METHOD FOR MANUFACTURING A COVER

(71) Applicant: International Automotive Components Group GmbH, Düsseldorf (DE)

(72) Inventors: Michael Loch, Freising (DE); Siegfried Lesnik, Toenisvorst (DE)

(73) Assignee: International Automotive Components Group GmbH, Dusseldorf (DE)

( * ) Notice: Subject to any disclaimer, the term of this patent is extended or adjusted under 35 U.S.C. 154(b) by 0 days.

(21) Appl. No.: 17/747,481

(22) Filed: May 18, 2022

(65) Prior Publication Data
US 2022/0371536 A1 Nov. 24, 2022

(30) Foreign Application Priority Data
May 21, 2021 (DE) .......................... 102021113280.0

(51) Int. Cl.
*B60R 21/2165* (2011.01)
*B60R 21/215* (2011.01)

(52) U.S. Cl.
CPC ...... *B60R 21/2165* (2013.01); *B60R 2021/21537* (2013.01)

(58) Field of Classification Search
CPC .................. B60R 21/2165; B60R 2021/21537
See application file for complete search history.

(56) References Cited

U.S. PATENT DOCUMENTS

| | | | | |
|---|---|---|---|---|
| 6,076,851 A | * | 6/2000 | Davis, Jr. .............. | B60R 21/205 280/732 |
| 6,595,543 B2 | * | 7/2003 | Desprez .............. | B60R 21/2165 280/728.2 |
| 7,100,941 B2 | * | 9/2006 | Riha ................... | B60R 21/2165 280/732 |
| 7,490,850 B2 | * | 2/2009 | Kanno ................ | B60R 21/2165 280/732 |
| 7,490,851 B2 | * | 2/2009 | Riester .................... | B60R 21/21 280/730.2 |
| 7,690,677 B2 | * | 4/2010 | Cowelchuk ......... | B60R 21/2165 280/732 |
| 7,744,115 B2 | * | 6/2010 | Kanno ................ | B60R 21/2165 280/732 |
| 7,900,956 B2 | * | 3/2011 | Megliola ............. | B60R 21/2165 280/728.3 |

(Continued)

FOREIGN PATENT DOCUMENTS

| | | |
|---|---|---|
| DE | 19516230 A1 | 11/1996 |
| DE | 29811739 U1 | 8/1998 |

(Continued)

*Primary Examiner* — Paul N Dickson
*Assistant Examiner* — Tiffany L Webb
(74) *Attorney, Agent, or Firm* — Grossman, Tucker, Perreault & PFleger, PLLC; Steven J. Grossman (57) ABSTRACT

A cover for an airbag device disposed on a supporting portion including an exit opening for an airbag, which is covered with a cover component. The cover includes a cover layer applied to the supporting portion and the cover component, the cover layer being weakened along a weakening line in or near a hinge region of the cover component.

22 Claims, 6 Drawing Sheets

(56) References Cited

U.S. PATENT DOCUMENTS

| | | | | |
|---|---|---|---|---|
| 8,181,987 | B2* | 5/2012 | Mazzocchi | B60R 21/215 |
| | | | | 280/732 |
| 8,393,635 | B2* | 3/2013 | Laboeck | B60R 21/2165 |
| | | | | 280/728.3 |
| 8,474,861 | B1* | 7/2013 | Twork | B60R 21/215 |
| | | | | 280/743.1 |
| 9,010,800 | B1* | 4/2015 | Hunter | B29C 66/7392 |
| | | | | 280/728.3 |
| 10,220,807 | B2* | 3/2019 | Mazzocchi | B60R 21/2165 |
| 10,703,318 | B2* | 7/2020 | Patnala | B60R 13/0256 |
| 10,752,197 | B2* | 8/2020 | Patnala | B60R 21/205 |
| 2002/0003343 | A1 | 1/2002 | Kansteiner | |
| 2006/0033313 | A1* | 2/2006 | Horiyama | B29C 66/30223 |
| | | | | 280/728.3 |
| 2009/0045610 | A1* | 2/2009 | Funakura | B60R 21/2165 |
| | | | | 280/728.3 |
| 2021/0016738 | A1* | 1/2021 | An | B60R 21/235 |

FOREIGN PATENT DOCUMENTS

| | | |
|---|---|---|
| DE | 10032104 A1 | 1/2002 |
| DE | 10253185 A1 | 6/2004 |
| DE | 102006008564 A1 | 8/2007 |
| DE | 102006054590 B3 | 1/2008 |
| EP | 0428935 B1 | 9/1995 |
| EP | 0741062 B1 | 7/2000 |

* cited by examiner

COVER FOR AN AIRBAG DEVICE, INTERIOR TRIM PART AND METHOD FOR MANUFACTURING A COVER

FIELD

A cover for an airbag device, an interior trim portion and a method of manufacturing a cover will be described.

Background

The cover is applicable in airbag devices used e.g. as a front, overhead or side impact protection in a motor vehicle. Such airbag devices include an airbag impact cushion and associated operational devices accommodated in a receiving space behind or below a supporting portion, e.g. behind or below the instrument panel of a motor vehicle, in the steering wheel of a motor vehicle or in doors and pillars of the motor vehicle as a side impact protection. The receiving space is covered by a cover, which may be formed together with the supporting portion. The cover and the supporting portion, e.g. a supporting member of an instrument panel, are connected to each other, predetermined breaking lines being formed between the cover and the supporting portion. When the airbag deploys, the connection between the supporting portion and the cover will break in the region of the predetermined breaking points so that the cover partially detaches from the supporting portion to tilt in a hinge region and to thus allow the impact cushion located below the cover to exit. The predetermined breaking lines determine predetermined breaking points, which may be dimensioned for a defined opening behavior of the cover at a predetermined ejecting force.

In addition, it is common practice to cover the instrument panel and other portions of the interior trim of a motor vehicle with a covering material such as a screening cover made of genuine or artificial leather, plastic films or skins, textiles and the like. This covering material spans both the supporting portion and the cover.

In order to ensure a proper functioning of the airbag device and, in particular, a defined opening operation of the cover, it is well-known in the prior art to provide the covering material in the region of the predetermined breaking lines with a tear line or tear seams. To this end, e.g. a leather cover may be composed of multiple portions, which are sewed together in the region of the predetermined breaking points. The stitch length, the strength and the material of the thread are selected depending on the desired tearing force, so that the seam will tear at a well-defined tearing force and the exit of the impact cushion is ensured.

In addition, it is well-known from the prior art to weaken the covering material and to reduce the material thickness of the covering material in the region of the predetermined breaking lines. For example, it was proposed to provide a covering material made of genuine or artificial leather, plastic film or textiles, in which a partial reduction in the material thickness of the covering material in the region of the predetermined breaking lines is achieved by removing material. For further explanation of the prior art, reference is made to documents DE 195 16 230 C2, DE 10 2006 054 590 B3, EP 0 428 935 B1 and EP 0 741062 B1.

In the airbag arrangements known from the prior art, the predetermined breaking points were optimized in the region of the provided tear line to control the tearing of the covering material and the opening operation of the cover when the cover pivots up about its hinge region. It was found out, however, that particularly at low temperatures in a region up to −35° C., for which airbag devices have to be designed, the connection between the cover and the supporting portion may even break or detach in the hinge region and the cover detaches from the supporting portion in whole or in part when the airbag deploys. In this case, the covering material in this region may also break or tear and particles may detach from the covering material in the hinge region. This may endanger passengers of the vehicle.

Therefore, the tearing behavior particularly of the covering material in case of deployment of an airbag will be further optimized.

Overview

A cover for an airbag device is proposed, particularly for use for an airbag device of a motor vehicle, which comprises a supporting portion including an exit opening for an airbag, which is covered with a cover component. The cover component covers, in its closed position, a receiving space for an airbag impact cushion and opens the receiving space when the airbag deploys by tilting in a hinge region. The cover includes a cover layer applied to the supporting portion and the cover component, the cover layer being weakened along a weakening line in or near the hinge region of the cover component. In addition, the supporting portion may include a weakening in the region of a tear line and/or in the hinge region of the airbag. Similarly, the cover layer may include a further weakening in the region of the tear line. The tear line may abut on the hinge region, e.g. in an approximately U-shaped manner, and may extend along the contour of the cover component. In another example, the tear line may be H-shaped, having two hinge regions for two cover segments.

The weakening of the cover layer in the hinge region can ensure that also in cases where the cover component detaches in whole or in part from the supporting portion when the airbag deploys, e.g. at low temperatures up to −35° C., a defined, smooth tear line forms through the cover layer. Chipping of particles in case of tearing of the cover layer can thus be prevented.

According to one aspect, the cover layer is weakened on a side facing the supporting portion along the weakening line, and the weakening line is aligned to the hinge region. More specifically, the cover layer may be weakened along the weakening line by at least one recess or scribing portion, which extends through only a part of the thickness of the cover layer. For example, the at least one recess or scribing portion may penetrate 10% to 75% of the thickness of the cover layer, preferably 20% to 60% or 40% to 60%, e.g. about 25%, 40%, 50%, 60% or 75%.

According to another aspect, the at least one recess or scribing portion may be formed continuously or discontinuously along the weakening line in the backside of the cover layer. In this case, the cover layer keeps a continuous undamaged surface on a frontside of the cover layer, which faces away from the supporting portion in the hinge region. It is possible to vary the length and the distance of individual scribing portions or recesses as well as their depth along the weakening line to control the tearing behavior of the cover layer. For example, a denser sequence of scribing portions or recesses and/or longer and/or deeper scribing portions or recesses may be provided at the outer ends of the hinge structure, whereas less and/or less long and/or less deep scribing portions or recesses are provided in the middle hinge region. Further, the at least one scribing portion or recess may be formed with a straight, wavy, zigzag or another similar shape along the weakening line in the backside of the cover layer. In addition, recesses and scribing portions can be combined. In this way, the tearing behavior of the cover layer can be deliberately adjusted and controlled.

The weakening line may be disposed directly over the hinge region or may be offset from the hinge region and may be parallel or approximately parallel to the hinge region. For example, the weakening line may be offset from the hinge region by up to 1 cm or up to 2 cm. It is also possible to dispose multiple weakening lines directly over, and/or offset from, the hinge region, the cover layer being weakened along the one or more weakening lines. This is also a way to deliberately adjust and, if required, to control the tearing behavior of the cover layer.

According to yet another aspect, a foam layer and/or a spacing layer connected to the cover layer are disposed between the cover layer and the supporting portion, and the foam layer or the spacing layer is connected to a frontside of the supporting portion. The weakening may occur in the soft layer and in the cover layer or preferably only in the cover layer.

According to one aspect, the soft layer may include a foam layer and/or a spacing layer. The foam layer may be made of a thermoplastic polymer, e.g. from or with polyurethane (PU), polyether sulphone (PES), polyvinyl chloride (PVC) or polyolefin (PO) such as polyethylene (PE), polypropylene (PP) and polymethyl pentene (PMP). The foam layer may also be made of a three-dimensional knitwear and/or may be combined with the spacing layer or replaced therewith. For the spacing layer, basically the same materials may be used as for the foam layer. The cover layer is preferably a decorative layer. Examples of the material for the cover layer or the decorative layer are textiles, genuine leather, artificial leather, e.g. PVC or a thermoplastic polymer such as thermoplastic polyurethane (TPU), a skin or film made of a thermoplastic polymer such as PVC, thermoplastic polyolefin (TPO), TPU or an ABS/PVC mixture (ABS: acrylonitrile butadiene styrene). Combinations of the above-mentioned foams, spacing layers and decorative layers may also be used to build up the cover layer.

The supporting portion and the cover component may be formed as an injection molded part made of a plastic material or as a compression molded part made of a fibrous material or in another way known per se. A hinge band may be connected to the supporting portion in the hinge region and may span the hinge region.

Further, an interior trim portion including a supporting portion and a cover of the type described above is disclosed. The interior trim portion may be a trim of an instrument panel, a center console, a door, a pillar such as the A-, B- or C-pillar, or a headliner or a part thereof, for example.

A method of manufacturing the airbag cover is also proposed. First, a cover layer is formed, which has a continuous front face and a recess or a scribing portion on its backside along a weakening line. Subsequently, the cover layer is applied to a supporting portion including an airbag exit opening with a cover component which are connected to each other in at least one hinge region. The cover layer is applied in such a way that it covers both the supporting portion and the cover component and that the weakening line comes to lie in or near the hinge region. A scribing portion may be formed along the weakening line by cutting, e.g. laser cutting or water jet cutting, milling or mechanically processing the cover layer in another way from its backside. A recess may be formed along the weakening line in the backside of the cover layer, e.g. during the formation of the cover layer.

The cover layer may be combined with a soft layer, the soft layer coming to lie between the cover layer and the supporting portion. The soft layer may or may not be weakened in the hinge region as well. The cover layer and the soft layer together make up the covering material.

The above-described aspects of this disclosure may be applied both individually and in combination, and aspects described in relation to the cover and the interior trim portion imply appropriate measures for the manufacture thereof.

BRIEF DESCRIPTION OF THE DRAWINGS

Examples will be explained below in detail with reference to the drawings.

DESCRIPTION OF THE EXAMPLES

In the following description, reference will be made to the frontside and the backside of the cover and of individual components of the cover or the airbag device or of the interior trim, among other things. In the context of this disclosure, the frontside refers to a side of the corresponding component, which faces a cabin of the motor vehicle, whereas the backside refers to a side of the component, which faces away from the cabin. In addition, the arrangement of various components in relation to each other will be described as overlying or underlying. In the context of this disclosure, a first component overlying a second component refers to a component which in relation to the second component faces the cabin of the motor vehicle, whereas a first component underlying a second component refers to a component which in relation to the second component faces away from the cabin.

The invention will be described below on the basis of an airbag device in an instrument panel of motor vehicle. The invention is not limited to this application and may be applied to any other interior trim portions of motor vehicles as well as to other devices including an airbag.

Figure 1:
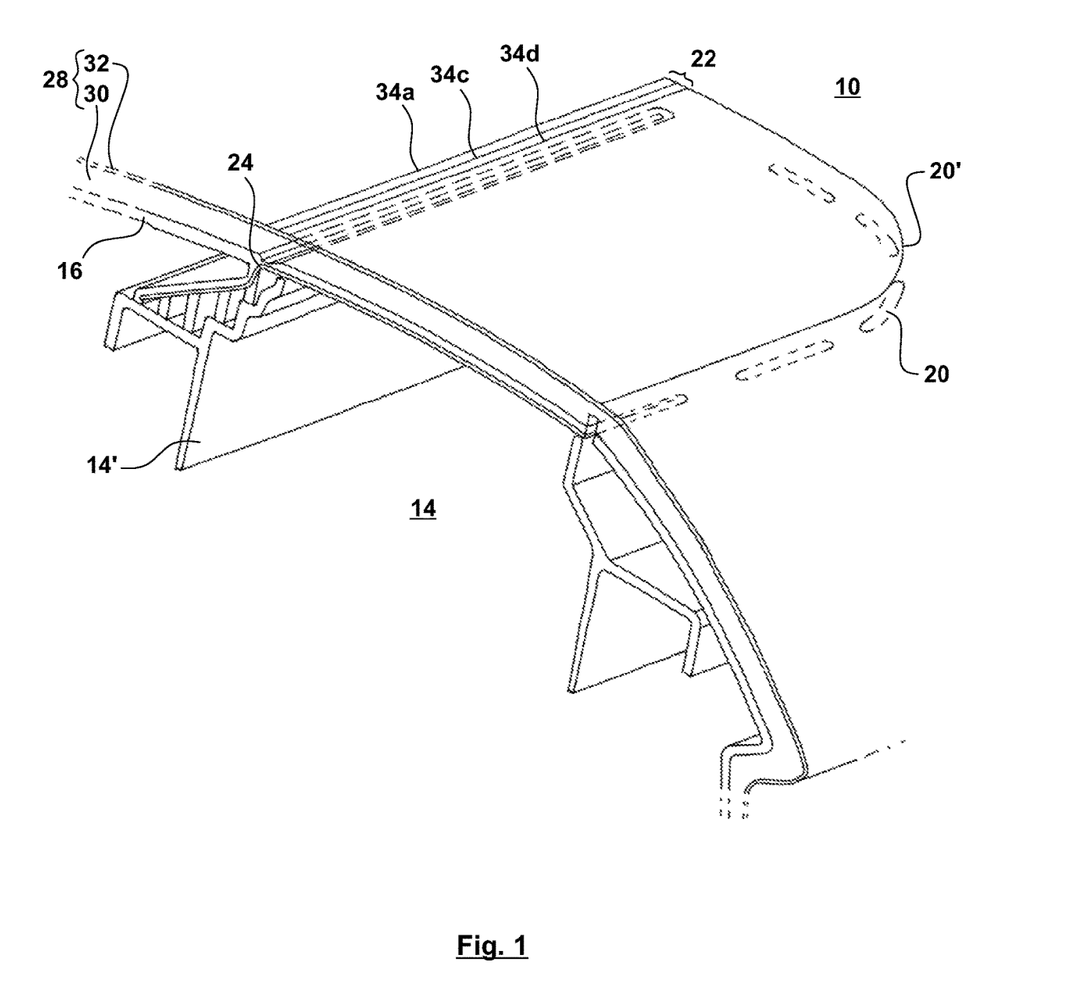
FIG. 1 shows a perspective view of a cutaway instrument panel including an airbag device according to an example.
Figure 2:
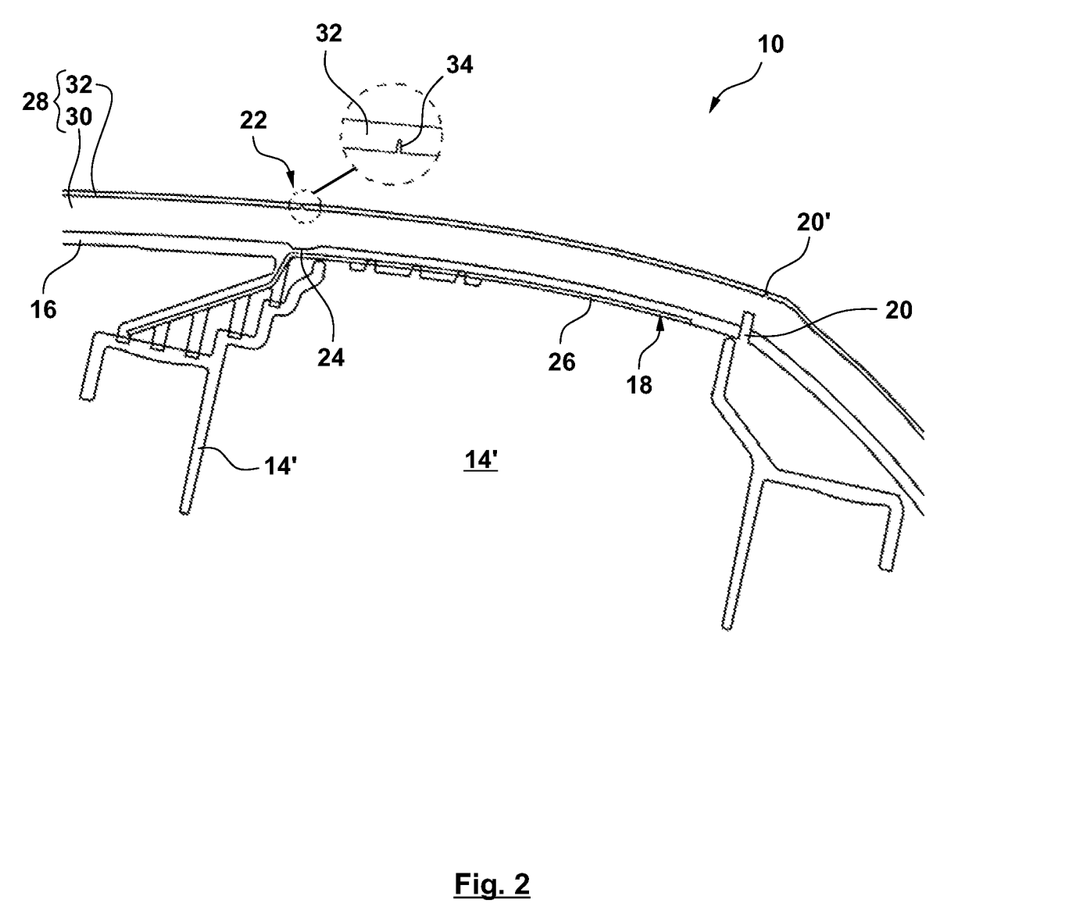
FIG. 2 shows a cross-sectional view of the instrument panel of FIG. 1 according to an example.

FIG. 1 shows a perspective cutaway view, and FIG. 2 shows a cross-sectional view of a part of an instrument panel 10 of a motor vehicle, which includes a region for an airbag device as a frontal impact protection on a passenger side. The region for the airbag device includes a passage 14 for an airbag impact cushion, and operational devices of the airbag, which are not shown in detail in FIGS. 1 and 2. The passage 14 is confined by a surrounding passage wall 14'. The coupling of the passage 14 and the associated operational devices below the instrument panel are basically known from the prior art and is illustrated in the following documents, for example: DE 298 11 739 U1, DE too 32 104 A1, DE 102 53 185 A1, and DE 2006 008 564 A1.

The instrument panel to includes a one-part or multipart supporting portion 16, which determines the contour of the instrument panel to and into which display and operating devices as well as an airbag module may be integrated. The airbag module is composed of an airbag impact cushion as well as operational devices such as a hot-gas or cold-gas generator, an acceleration sensor, a triggering unit, etc. The receiving space for the airbag module is disposed below a region 12 of the instrument panel to. The passage walls 14' of the passage 14 are connected to the backside of the supporting portion 16, the passage walls 14' as well as the supporting portion 16 including stiffening structures in the region of their connection, if required. Over the passage 14, a cover component 18 is integrated into the supporting portion 16 or is connected thereto, in order to cover the passage 14. The cover component 18 may also include stiffening ribs or similar reinforcing structures, as indicated in FIG. 2. In one example, the cover component 18 and the supporting portion 16 are formed by a uniform molded part, e.g. by injection molding a plastic material or by molding a plate material or compression molding a fibrous or plastic material.

The molded part, which makes up the supporting portion 16 and the cover component 18 in this example, may be made of natural fiber or plastic material and, basically, of thermoplastics or thermosetting plastics or a combination thereof as well as of fibers. In various examples, the support may include polypropylene (PP) or glass fiber reinforced polypropylene (PP-GF) or acrylonitrile butadiene styrene (ABS) as a main constituent. The support may have a thickness in the order of 2.5 mm to 4 mm, for example.

During the formation of the molded part or in any subsequent processing step, a tear line or predetermined breaking line 20 is formed between the cover component 18 and the supporting portion 16, which ensures a defined opening operation of the cover component 18 when the airbag impact cushion below the cover component 18 is deployed. The predetermined breaking line may be formed in the supporting portion 16 by laser cutting or water jet cutting, for example. In addition, a hinge 24 is formed in a hinge region 22 between the supporting portion 16 and the cover component 18, e.g. by a material taper in the supporting portion 16 in the transition region between the supporting portion 16 and the cover component 18.

In the example of FIGS. 1 and 2, a hinge band 26 is additionally connected to the supporting portion 16 and the cover component 18. More specifically, the hinge band 26 in this example is formed into the cover component 18 and into a reinforcing structure of the supporting portion 16, as can be seen best in FIG. 2. The hinge band 26 spans the hinge region 22. The hinge band 26 may be configured e.g. as a fabric, the main constituent thereof being polyester, e.g. PES, or aramid. The hinge band 26 may have a thickness in the order of 0.8 mm the 1.5 mm, for example.

As is shown in FIGS. 1 and 2, the supporting portion 16 of the instrument panel and the cover component 18 are covered with a covering material 28, which is made up of two layers, i.e. a soft foam layer 30 and a cover layer 32, in the embodiment shown. The cover layer 32 will also be referred to as a decorative layer 32 hereafter. A circular sectional enlargement of the covering material 28 in the hinge region 22 is shown in FIG. 2. For example, the foam layer 30 may be made of a PU foam, polyester such as PES, polyolefin or polyvinyl chloride, or may also include a three-dimensional knitwear or another spacing layer. In one example, the foam layer 30 has a thickness in the order of 2 mm to 10 mm. The decorative layer 32 may be made of a textile, genuine leather, artificial leather, a plastic film, a slush skin or the like. The decorative layer 32 may be expandable, and possible materials für the expandable decorative layer 32 are PVC, TPO, TPU or an ABS/PVC mixture, but the disclosure is not limited thereto. In one example, the decorative layer has a thickness in the order of 0.8 mm to 1.5 mm. The covering material 28 may be applied to the supporting portion 16 and the cover component 18 by laminating or foaming.

The cover component 18 is separated from the supporting portion 16 by the tear line 20, wherein the covering material 28 may comprise, in the region of the tear line 20, a structural weakening 20' which is congruent or almost congruent with the tear line 20. The tear line 20 is formed in the supporting portion 16 in such a way that the cover component 18 remains connected to the supporting portion 16 through the hinge region 22 between the supporting portion 16 and the cover component 18. This hinge region 22 may be formed by a seamless transition from the cover component 18 to the supporting portion 16, or may include a film hinge formed by a thickness reduction of the material between a longitudinal edge of the cover component 18 and the supporting portion 16. The hinge may further include an embedded hinge band 26 as shown in FIG. 2, or another type of hinge allowing the cover component 18 to swing upwards when the airbag is deployed.

In the example of FIGS. 1 and 2, the tear line 20 and the structural weakening 20', which separate the cover component 18 from the supporting portion 16, align, and hence are congruent over at least a part of the tear line 20. The tear line 20 in the supporting portion 16 and the structural weakening 20' in the covering material 28 may be formed by a uniform cutting process, a continuous or a discontinuous cutting line or perforation being formed through the material of the supporting portion 16 and a part of the covering material 28. The cutting process may be perpendicular or oblique to the surface of the covering material 28. Alternatively, the tear line 20 in the supporting portion 16 and the structural weakening 20' on the backside of the covering material 28 may be formed in separate processing steps before the covering material 28 is applied to the supporting portion 16. The supporting portion 16 may be completely cut through in the region of the tear line 20, whereas the covering material 28 is only partially cut through. For example, the cutting process may completely cut through the foam layer 30 of the covering material 28 and may only partially penetrate into the backside of the decorative layer 32 so that the frontside of the decorative layer 32 remains intact.

The tear line 20 and the structural weakening 20' do not need to align or to completely align. For example, the tear line 20 and the structural weakening 20' may align only in both the radius regions but do not align at the opening edge (visible in FIG. 2) and at both the sides either. The line 20' is offset in relation to the line 20, e.g. in the direction towards the passenger, by about 2 mm or by 0 mm to 5 mm, preferably by 1 mm to 2 mm, and the lateral offset may be even larger, e.g. from 0 mm to 10 mm, preferably from 3 mm to 6 mm, and may also run "away" from the radius outwards obliquely in the direction towards the hinge region. In this example, the structural weakening 20' may be formed in a separate process step and may have a larger length and width than the tear line 20.

According to the invention, a weakening is also formed in the hinge region 22 of the cover, at least in the cover layer 32. More specifically, in the example shown, at least one weakening line 34a, 34b, 34c is formed by a recess or scribing portion on the backside of the cover layer 32, which extends through a part of the thickness of the cover layer 32. The weakening line, which hereafter may be abbreviated to "34", extends parallel to the hinge 24 in or near the hinge region 22. One or more weakening lines 34 may be disposed immediately over the hinge 24 or may be disposed offset from and parallel thereto. In one example, the weakening lines 34 are offset from the hinge region 22 by up to 1 cm or up to 2 cm in the direction towards the cover component 18 or away therefrom.

More specifically, the cover layer 32 may be weakened along the weakening line 34 by at least one recess or scribing portion extending through a part of the thickness of the cover layer 32. For example, the at least one recess or scribing portion may penetrate 10% to 75% of the cover layer 32 from its backside, preferably 20% to 60% or 40% to 60%, e.g. 25%, 40%, 50%, 60% or 75%. A scribing portion on the backside of the cover layer 32 may be formed by cutting, e.g. by laser cutting or water jet cutting. A recess on the backside of the cover layer 32 may be formed during the formation of the cover layer 32.

As will be further illustrated by reference to examples below, the weakening line 34 may be continuously or discontinuously formed in the backside of the cover layer 32. In this case, the surface of the cover layer 32 remains continuous and intact on a front face of the cover layer 32, which faces away from the supporting portion 16 in the hinge region 22. It is possible to vary the length and the distance of individual scribing portions or recesses as well as their depth along the weakening line 34 to control the tearing behavior of the cover layer 32. For example, a denser sequence of scribing portions or recesses and/or longer and/or deeper scribing portions or recesses may be provided at the outer ends of the hinge region 22, whereas less and/or less long and/or less deep scribing portions or recesses are provided in the middle hinge region. Further, the at least one recess or scribing portion may be formed with a straight, wavy, zigzag or similar shape along the weakening line 34 in the backside of the cover layer 32. In addition, recesses and scribing portions can be combined. In this way, the tearing behavior of the cover layer 32 and the covering material 28 in total can be deliberately adjusted and controlled.

The circular sectional enlargement in FIG. 2 shows a scribing portion along the weakening line 34, which is formed in the backside of the cover layer 32, the scribing portion of this example penetrating about 40% to 60% of the cover layer 32 and having no effect on the foam layer 30. In another embodiment, the foam layer 30 may also be weakened, e.g. may be cut through in whole or in part along the weakening line 34. This is done in dependence on the materials and production processes used, for example. In addition, the supporting portion 16 is also weakened by a reduction of its thickness in the hinge region 22. As a result, a film hinge may be formed.

In the example shown, the weakening line 34 is disposed over and parallel to the hinge region 22. As indicated in FIG. 2, the weakening line 34 may also be offset from the hinge region 22, e.g. by up to 1 cm or up to 2 cm in both directions. It is also possible to provide multiple weakening lines 34a, 34b, 34c as indicated in the Figures.

Figure 3A:
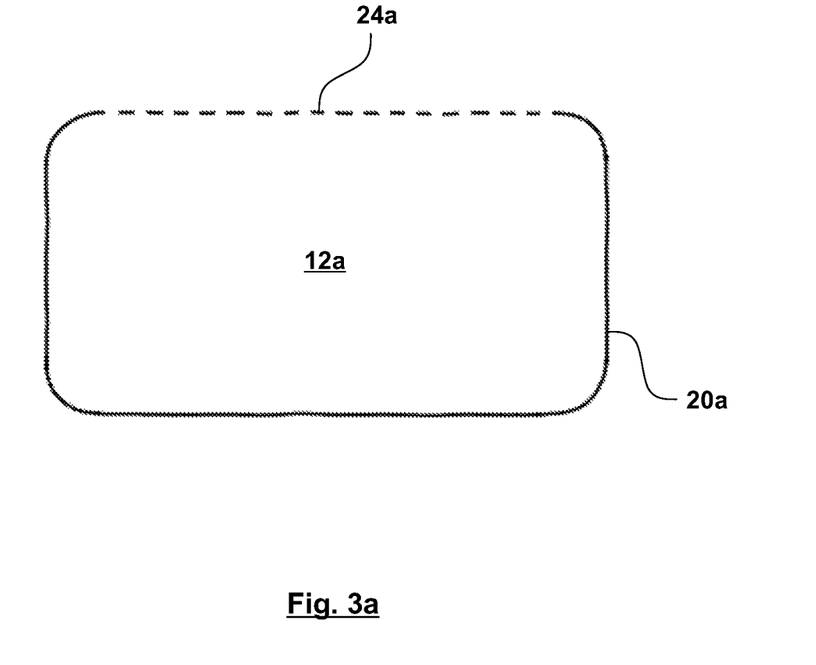
FIGS. 3a through 3d show schematic views of possible arrangements of tear lines and weakening lines in covers according to various examples.
Figure 3B:
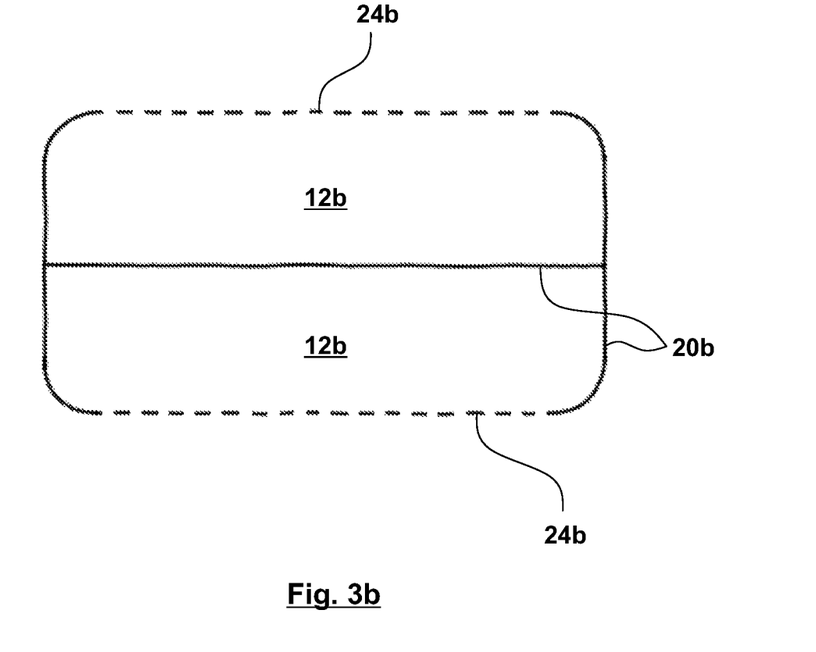
Figure 3C:
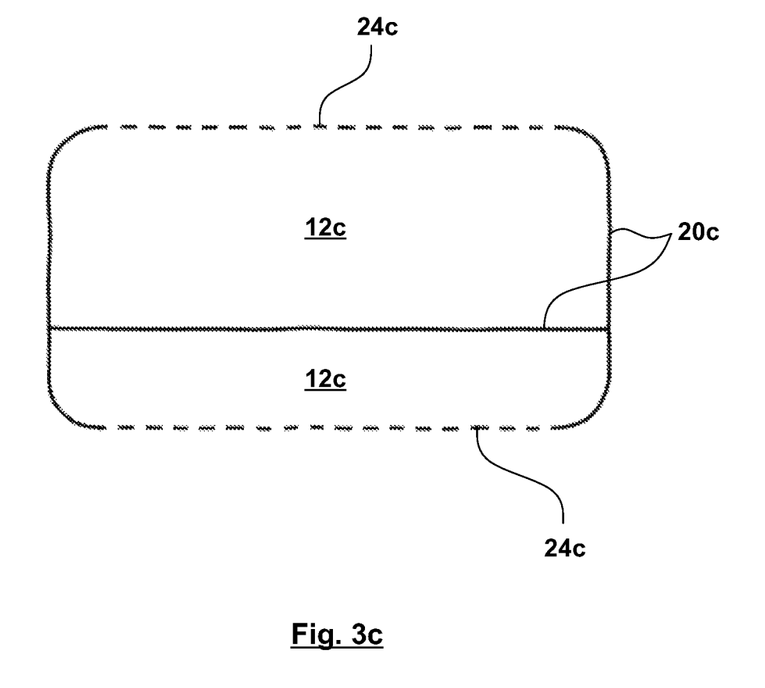
Figure 3D:
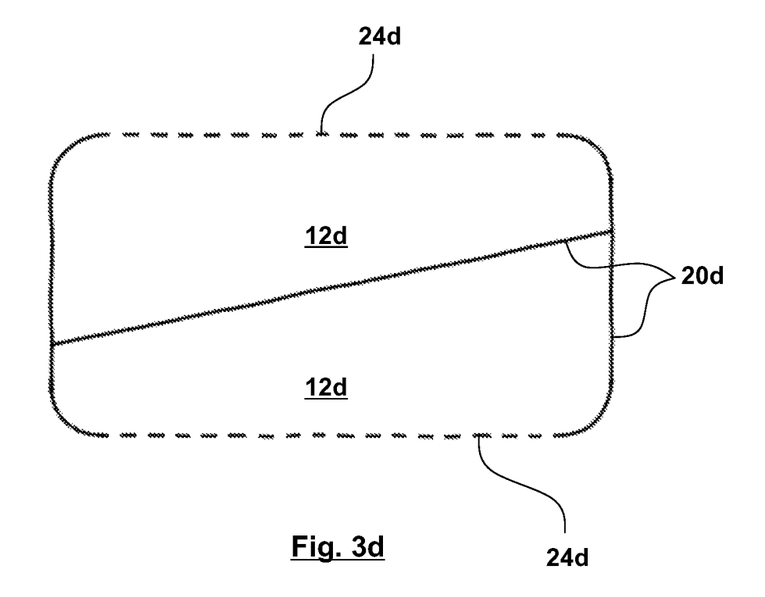

FIGS. 3a to 3d show different configurations for cover components of an airbag device according to various examples. FIG. 3a shows an example of a cover component having a so-called U-configuration, in which a U-shaped tear line 20a and a hinge 24a, which connects both legs of the U, confine a cover component 12a which is pivotable through the hinge 24a. FIG. 3b shows an example of a cover component having a so-called H-configuration, in which a H-shaped tear line 1ob and two hinges 24b, which connect the legs of the H, confine the cover component which is configured with two halves 12b pivoting through the hinges 24b in opposite directions. FIGS. 3c and 3d show examples of cover components having a modified H-configuration, in which a H-shaped tear line 20C, god and two hinges 24c, 24d which connect the legs of the H, confine the respective cover component which is configured with two cover segments 12C, 12d pivoting through the hinges 24c, 24d in opposite directions. In FIG. 3c, the cover component is subdivided into dissimilar cover segments 12C. In FIG. 3d, the dividing line between both the cover segments 12d runs obliquely to the orientation of the hinges 24d. Different configurations for the cover component of the airbag device may be chosen in dependence on the application and assembling position.

Figure 4A:
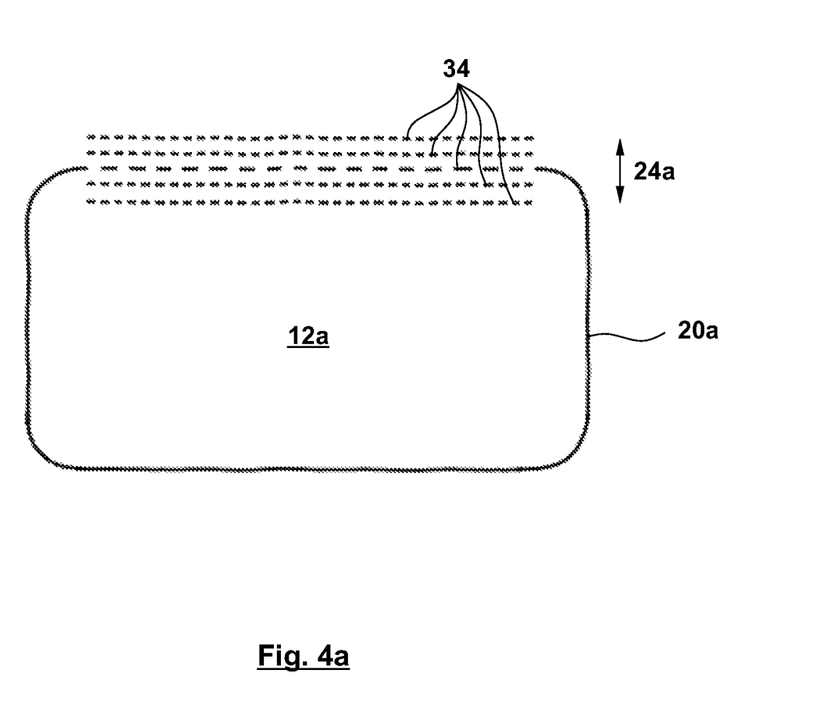
FIGS. 4a and 4b show schematic views of possible arrangements of weakening lines in covers according to various examples.
Figure 4B:
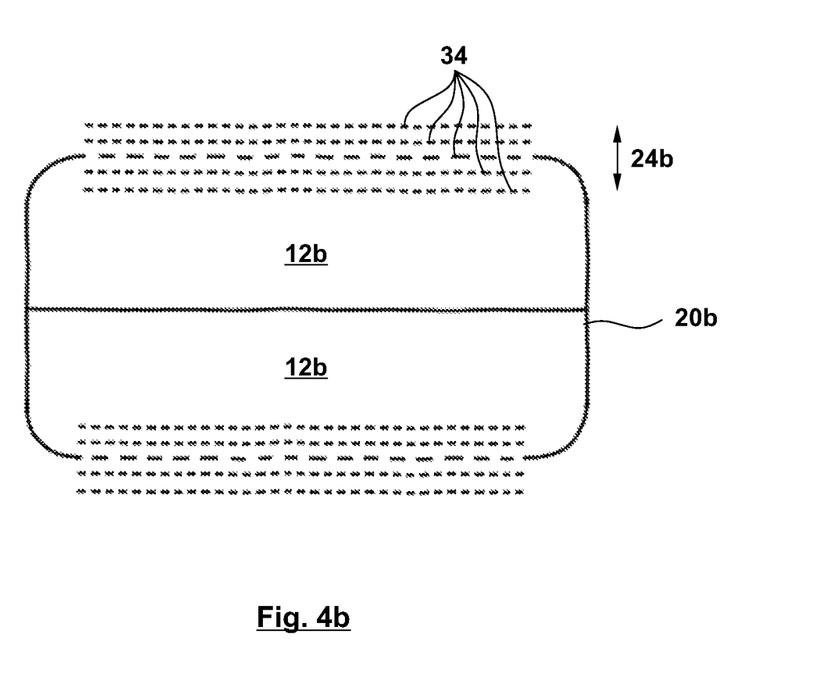

FIGS. 4a and 4b show additional configurations for cover components of an airbag device according to various examples, which may be combined with the examples of FIGS. 3a to 3d. The example of FIG. 4a substantially corresponds to the U-configuration of FIG. 3a and illustrates the possible position of one or more weakening lines 34 in relation to the hinge 24a. The example of FIG. 4b substantially corresponds to the H-configuration of FIG. 3b and also illustrates the possible position of one or more weakening lines 34 in relation to each of the hinges 24b. Similar components as in the preceding Figures are denoted by the same reference symbols. As was illustrated above, the weakening lines 34 may be disposed directly over a hinge 24a, 24b or may extend in such a way that they are offset from and parallel to the hinge 24a, 24b, at a distance of up to 1 cm or of up to 2 cm in both directions, for example. It is possible the provide one or more weakening lines 34 in the region of or near a hinge, e.g. 24a, 24b, 24c, 24d.

Figure 5:
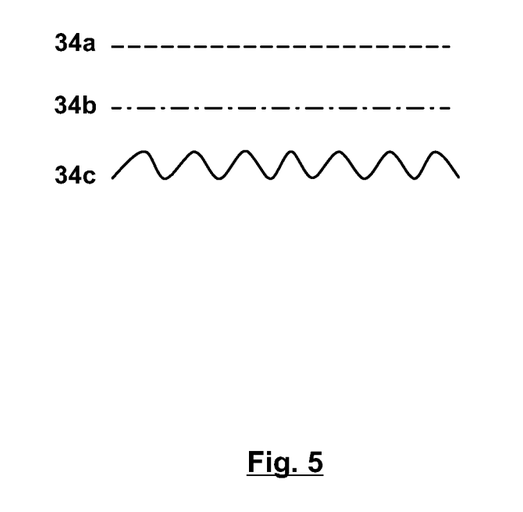
FIG. 5 schematically shows possible configurations of a weakening line in covers according various examples.

FIG. 5 shows examples of the shape of an individual weakening line 34a, 34b, 34c, which basically may be continuous or discontinuous. In the examples of the weakening lines 34a and 34b, the weakening lines are straight and discontinuous and have a dashed line structure and a dash-dot line structure, respectively. In the example of the weakening line 34c, the weakening line is wavy and continuous and has a solid line structure. Other configurations are also possible, e.g. a dotted line structure or a structure having a number of scribing portions or recesses extending transversely to the orientation of the hinge. The configurations shown may be combined with other ones, and the structure of the weakening line may be varied over its length, as was disclosed above.

Providing one or more weakening lines in the hinge region has been shown to allow to ensure a precise tearing of the covering material layer even at very low temperatures, in the region up to −35° C., wherein even in the case that the cover component in the hinge region detaches in whole or in part from the supporting portion, a defined tear line is formed and no particles detach from the covering material. This improves the safety of the airbag device.

The airbag cover may be formed by first forming and processing the cover layer so that it comprises a continuous front face and one or more recesses or scribing portions in its backside along a provided weakening line. The cover layer is then applied to a supporting portion, with or without an additional soft layer, the supporting portion including an airbag exit opening with a cover component, which are connected in at least one hinge region. The covering material may, for example, be adhered, foamed or laminated onto the supporting portion so that it covers both the supporting portion and the cover component and the weakening line comes to lie in or near the hinge region. Subsequently, the tear line in the supporting portion and a structural weakening in the covering material may be formed along the tear line e.g. by milling, laser treatment or cutting, the weakening line and the tear line confining the cover component. A scribing portion along the weakening line may be formed e.g. by cutting, milling or mechanically processing the cover layer in another way from its backside. A recess along the weakening line may be formed in the backside of the cover layer during the formation of the cover layer.

The covering material may comprise a soft layer, e.g. a foam layer and/or a spacing layer, in combination with the cover or decorative layer. With such a configuration, the scribing portion or recess may penetrate a part of the foam layer and/or of the spacing layer from the backside of the covering material, or the soft layer may remain intact. In one example, the scribing portion may extend only into the bottom of the decorative layer.

The disclosure includes the following embodiments in particular:

1. A cover for an airbag disposed behind a supporting portion comprising an exit opening for the airbag, which is covered with a cover component, wherein the cover includes a cover layer applied to the supporting portion and the cover component, wherein, in or near a hinge region of the cover component, the cover layer is weakened on a side facing the supporting portion along a weakening line, and wherein the weakening line is aligned to the hinge region.
2. The cover according to the embodiment 1, wherein the cover layer is weakened along the weakening line by at least one recess or scribing portion, which extends through a part of the thickness of the cover layer.
3. The cover according to the embodiment 2, wherein the at least one recess or scribing portion penetrates 10% to 60% of the thickness of the cover layer.
4. The cover according to any one of the proceeding embodiments, wherein the at least one recess or scribing portion is formed continuously along the weakening line in the backside of the cover layer.
5. The cover according to any one of embodiments 1 to 3, wherein the at least one recess or scribing portion is formed discontinuously along the weakening line in the backside of the cover layer.
6. The cover according to any one of the proceeding embodiments, wherein the at least one recess or scribing portion is formed with a straight, wavy or zigzag shape along the weakening line in the backside of the cover layer.
7. The cover according to any one of the proceeding embodiments, wherein the weakening line is disposed over the hinge region.
8. The cover according to any one of the proceeding embodiments, wherein the weakening line is offset from the hinge region and is parallel or approximately parallel to the hinge region.
9. The cover according to the embodiment 8, wherein the weakening line is offset from the hinge region by up to 2 cm, preferably by up to 1 cm.
10. The cover according to any one of the proceeding embodiments, wherein multiple weakening lines are provided and the cover layer is weakened along the multiple weakening lines.
11. The cover according to any one of the proceeding embodiments, wherein the cover includes a soft layer disposed between the cover layer and the frontside of the supporting portion.
12. The cover according to the embodiment ii, wherein the weakening is formed only in the cover layer.
13. The cover according to the embodiment ii, wherein the weakening is formed both in the cover layer and the soft layer.
14. The cover according to any one of the embodiments 11 to 13, wherein the cover layer is a decorative layer, preferably a decorative layer made of PVC, PU or TPO.
15. The cover according to any one of the embodiments 11 to 14, wherein the soft layer comprises a foam layer and/or a spacing layer, which are preferably made of PU or PES.
16. The cover according to any one of the proceeding embodiments, which includes a hinge band, which is connected to the supporting portion in the hinge region and spans the hinge region.
17. The cover according to any one of the proceeding embodiments, wherein the cover layer includes a continuous front face facing away from the supporting portion.
18. A method of manufacturing a cover for an airbag, comprising: forming a cover layer including a continuous front face and a recess or a scribing portion on a backside of the cover layer along a weakening line; and applying the cover layer to a supporting portion including an airbag exit opening with a cover component, which are connected in at least one hinge region so that the cover layer covers both the supporting portion and the cover component and the weakening line comes to lie in or near the hinge region.
19. The method according to the embodiment 18, wherein the scribing portion is formed along the weakening line by cutting, milling or mechanically processing the cover layer in another way from its backside.
20. The method according to the embodiment 18, wherein a recess is formed along the weakening line in the backside of the cover layer during the formation of the cover layer.
21. The method according to any one of the embodiments 18 to 20, wherein a soft layer is applied to a side of the cover layer, which faces the supporting portion, before the cover layer is applied to the supporting portion so that the soft layer comes to lie between the cover layer and the supporting portion.

The features disclosed in the above description, in the Figures and the claims may both individually and in any combination be relevant to the implementation of the invention in the various embodiments thereof.

LIST OF REFERENCE SYMBOLS

10 Instrument panel
12 Region for airbag
14 Passage
16 Supporting portion
18 Cover component
20 Tear line
20' Structural weakening
22 Hinge region
24 Hinge
26 Hinge band
28 Covering material
30 Soft layer, foam layer
32 Cover layer, decorative layer
34 Weakening line

What is claimed is:

1. A cover for an airbag disposed behind a supporting portion, the supporting portion comprising an exit opening for the airbag, which is covered with a cover component, the cover further comprising:
   wherein the cover has a cover layer applied to the supporting portion and the cover component, the cover layer having a frontside which provides a front face of the cover, the cover layer having a thickness of 0.8 mm to 1.5 mm and wherein the cover layer has a hinge region,
   wherein a single molded part forms the supporting portion, the cover component and a hinge between the supporting portion and the cover component wherein the hinge is defined by a material taper in the supporting portion wherein the supporting portion has a thickness in the range of 2.5 mm to 4 mm,
   wherein, the cover is weakened by a plurality of weakening lines on a backside of the cover layer opposite the frontside of the cover layer, wherein said weakening lines are disposed over said hinge in said supporting portion or offset up to 2 cm, wherein the cover layer is leather.

2. The cover according to claim 1, wherein at least one weakening line of the plurality of weakening lines is formed by at least one recess or scribing portion extending through a portion of a thickness of the cover layer.

3. The cover according to claim 2, wherein the at least one recess or scribing portion penetrates 10% to 60% of the thickness of the cover layer.

4. The cover according to claim 2, wherein:
   the at least one recess or scribing portion is formed continuously along the weakening line in the backside of the cover layer, or
   the at least one recess or scribing portion is formed discontinuously along the weakening line in the backside of the cover layer.

5. The cover according to claim 2, wherein the at least one recess or scribing is formed with a straight, wavy or zigzag shape along the at least one weakening line.

6. The cover according to claim 1, wherein the plurality of weakening lines are disposed in the hinge region.

7. The cover according to claim 1, wherein at least one weakening line of the plurality of weakening lines is parallel or approximately parallel to the hinge region.

8. The cover according to claim 1, wherein the plurality of weakening lines are parallel or approximately parallel to the hinge region.

9. The cover according to claim 1, wherein at least one weakening line of the plurality of weakening lines is a continuous weakened line, a dashed weakened line, a dotted weakened line or a dashed-dotted weakened line.

10. The cover according to claim 1, wherein the cover includes a soft layer disposed between the backside of the cover layer and a frontside of the supporting portion and the cover component.

11. The cover according to claim 10, wherein the soft layer is not weakened in the hinge region.

12. The cover according to claim 10, wherein the soft layer is weakened in the hinge region.

13. The cover according to claim 1, wherein the leather is artificial leather made of at least one of polyvinyl chloride, polyurethane or a thermoplastic polyolefin.

14. The cover according to claim 10, wherein the soft layer comprises a foam layer and/or a spacing layer.

15. The cover according to claim 1, which includes a hinge band which is connected to the supporting portion in the hinge region and spans the hinge region.

16. The cover according to claim 1, wherein the cover layer includes a continuous frontside face over the plurality of weakening lines.

17. A method of manufacturing a cover for an airbag disposed behind a supporting portion, the supporting portion comprising an exit opening for the airbag, which is covered with a cover component, the method comprising:
   forming a cover layer which includes a frontside which provides a front face of the cover and a plurality of weakening lines on a backside of the cover layer opposite the frontside of the cover layer, the cover layer having a thickness of 0.8 mm to 1.5 mm wherein the cover layer has a hinge rgion; and
   applying the cover layer to the supporting portion and the cover component,
   wherein a single molded part forms the supporting portion, the cover component and a hinge between the supporting portion and the cover component wherein the hinge is defined by a material taper in the supporting portion wherein the supporting portion has a thickness in the ragne of 2.5 mm to 4 mm,
   wherein the cover layer is weakened by the plurality of weakening lines on the backside of the cover layer opposite the front side of the cover layer, wherein said weakening lines are disposed over said hinge in said supporting portion or offset up to 2 cm, and
   wherein the cover layer is leather.

18. The method according to claim 17, wherein at least one weakening line of the plurality of weakening lines is formed by at least one recess or scribing portion.

19. The method according to claim 17, wherein at least one weakening line of the plurality of weakening lines is formed by at least one recess formed during the formation of the cover layer.

20. The method according to claim 17, wherein a soft layer is applied to a backside of the cover layer before the cover layer is applied to the supporting portion and the cover component.

21. A cover for an airbag disposed behind a supporting portion, the supporting portion comprising an exit opening for the airbag, which is covered with a cover component, the cover further comprising:
   wherein the cover has a cover layer and a soft layer, the soft layer disposed between a backside of cover layer, opposite a frontside of the cover layer which provides a front face of the cover, and a frontside of the supporting portion and the cover component, the cover layer having a thickness of 0.8 mm to 1.5 mm,
   wherein the cover has a hinge region,
   wherein the cover is weakened by a weakening line on the backside of the cover layer, and the soft layer is not weakened,
   wherein a single molded part forms the supporting portion, the cover component and a hinge between the supporting portion and the cover component, wherein the hinge is defined by a material taper in the supporting portion where the supporting portion has a thickness in the range of 2.5 mm to 4 mm,
   wherein the cover layer is leather and includes a plurality of weakening lines on a backside of the cover layer opposite a frontside of the cover layer, wherein said weakening lines are disposed over said hinge in said supporting portion or offset up to 2 cm.

22. The cover according to claim 21, wherein the leather is artificial leather made of at least one of polyvinyl chloride, polyurethane or a thermoplastic polyolefin.

\* \* \* \* \*